(12) United States Patent
Hobelsberger

(10) Patent No.: US 7,006,639 B2
(45) Date of Patent: Feb. 28, 2006

(54) ACTIVE NOISE-ATTENUATING DUCT ELEMENT

(76) Inventor: Maximilian Hans Hobelsberger, Dorfstr 16, Wuerenlingen (CH) 5303

( * ) Notice: Subject to any disclaimer, the term of this patent is extended or adjusted under 35 U.S.C. 154(b) by 510 days.

(21) Appl. No.: 10/294,324

(22) Filed: Nov. 15, 2002

(65) Prior Publication Data
US 2003/0095672 A1    May 22, 2003

Related U.S. Application Data

(60) Provisional application No. 60/331,600, filed on Nov. 20, 2001.

(51) Int. Cl.
*H04R 3/00* (2006.01)
*A61F 11/06* (2006.01)

(52) U.S. Cl. ................................ 381/96; 381/71.5
(58) Field of Classification Search ............... 381/71.5, 381/96
See application file for complete search history.

(56) References Cited

U.S. PATENT DOCUMENTS

| | | | | |
|---|---|---|---|---|
| 4,665,549 A | * | 5/1987 | Eriksson et al. | 381/71.5 |
| 5,452,362 A | * | 9/1995 | Burward-Hoy | 381/71.5 |
| 5,619,020 A | * | 4/1997 | Jones et al. | 181/206 |
| 5,812,686 A | * | 9/1998 | Hobelsberger | 381/96 |
| 6,088,459 A | * | 7/2000 | Hobelsberger | 381/96 |

* cited by examiner

*Primary Examiner*—Laura A. Grier

(57) ABSTRACT

The active HVAC duct element can be inserted into a HVAC duct for attenuation of noise. The element works with an acoustical series arrangement of a passive acoustical component and an active acoustical component.

11 Claims, 5 Drawing Sheets

ACTIVE NOISE-ATTENUATING DUCT ELEMENT

Reference is made to the corresponding provisional application, No. 60/331,600, filed Nov. 20, 2001, to claim the priority date under 35 U.S.C. 119(e).

BACKGROUND OF THE INVENTION

1. Field of the Invention

This invention relates to systems which actively absorb noise. More particularly it relates to active systems to absorb noise in HVAC ducts.

2. Prior Art

In some applications in the field of acoustics devices are needed which reflect or absorb acoustical waves in a specified way. One of these applications is in HVAC systems to absorb or block air-born noise produced by the HVAC fans and compressors. At high frequencies this specified behaviour, e.g. absorpion, can be achieved by simple, passive constructive means, i.e. the of use absorptive materials like foam rubber or glass wool, and by giving the non-reflecting surface a special shape. However at low frequencies the dimensions of absorptive structures get large and impractical.

Solutions are known in which an active noise cancellation device is incorporated into the HVAC duct (e.g. Nelson & Elliott, "Active Control of Sound", ch. 7.8).

It is an objective of this invention to improve the performance of such active noise blockers in HVAC ducts.

An important component which is used in the present invention is Max Hobelsberger's device for simulation of an acoustical impedance (U.S. Pat. No. 5,812,686) which is used to establish a specified acoustical impedance. This device is an active device which uses an electroacoustic transducer which acts, together with a control system, as acoustical impedance.

Another component used in this invention is an element described in U.S. Pat. No. 6,088,459 (Inv. Max Hobelsberger).

SUMMARY OF THE INVENTION

The invented system follows the functional principle, that an acoustical lowpass filter of higher order is created by series or parallel connections of passive duct segments (e.g. one pipe or a bundle of pipes) and active acoustic elements which act as cavities or other suited acoustical impedances. The cutoff-frequency of such a filter is chosen to be so low that disturbing acoustical frequencies are effectively suppressed and reach the out-port of the duct only highly attenuated.

The pipe or the bundle of pipes is pneumatically connected to an air chamber. The air pressure in this chamber is influenced by the movement of a membrane of an electro-mechanic transducer. This transducer works together with a control system in a predetermined manner which simulates certain chamber characteristics, e.g. an increased chamber volume as in U.S. Pat. No. 6,088,459, or it simulates an acoustical imdedance according to the device of U.S. Pat. No. 5,812,686. Typically the inflow-pipes end in this chamber and the outflow pipes start there.

This air chamber is built up in accordance with the active chamber of U.S. Pat. No. 6,088,459. It consists of a housing with a front wall (which may be also omitted if constructively more convenient), side walls, an inner wall and an electroacoustic transducer arranged inside the housing into this inner wall. The front wall allows a pneumatic communication between inside and outside of the housing. For example it may be equipped with one or more openings which permit air to flow between inside and outside. Or it may be equipped with one or more displaceable membranes which are moved by pressure differences between inside and outside the housing. The housing could be either of the closed type, or it could be a vented housing.

The inner transducer is built into an opening of an inner wall of the housing. This inner wall separates a first air chamber which adjoins the holes in the front wall from one or more other chambers within the housing. The inner transducer is preferably an electrodynamic transducer, similar to an electrodynamic loudspeaker, however other types of transducers may be used too. In case of an electrodynamic transducer its membrane is driven by a coil which is placed in the magnetic field of the transducer's magnet system.

This inner transducer influences with the movement of its membrane the pressure inside this first chamber. Pressure sensing means, e.g. a pressure sensor of any kind (for example resistive, capacitive, inductive, sensors made of piezomaterial, electret sensors, micromachined sensors), is mounted inside this chamber to measure the air pressure or changes of the pressure which is influenced by the movement of the membrane of the inner transducer and by the air pressure outside of the housing, i.e. in front of the front wall. The output signal of the pressure sensing means is conveyed to calculating means, i.e. a micro-processor or analog circuits comprising operation amplifiers, which produce further signals. These signals are applied as setpoint values of movement to a controller (microprocessor or analog circuit) which controls via a power amplifier the movement, e.g. the speed, of the inner transducer's membrane.

The controller forces the membrane of the inner transducer to move with momentary values of movement, e.g. with a speed, according to the setpoint values of movement. These setpoint values are calculated, based on the pressure values, in such a way that the desired acoustical properties are achieved. In an improved version this control system also comprises sensors which measure the position or the movement (e.g. speed, acceleration) of the membrane and use this information for better control of the movement of the membrane.

The duct pipes are pneumatically connected to this first chamber via holes (or one big hole) in the front wall.

For a fuller understanding of the nature of the invention, reference should be made to the following detailed description of the preferred embodiments of the invention, considered together with the accompanying drawings.

DESCRIPTION OF THE PREFERRED EMBODIMENTS

Figure 1:
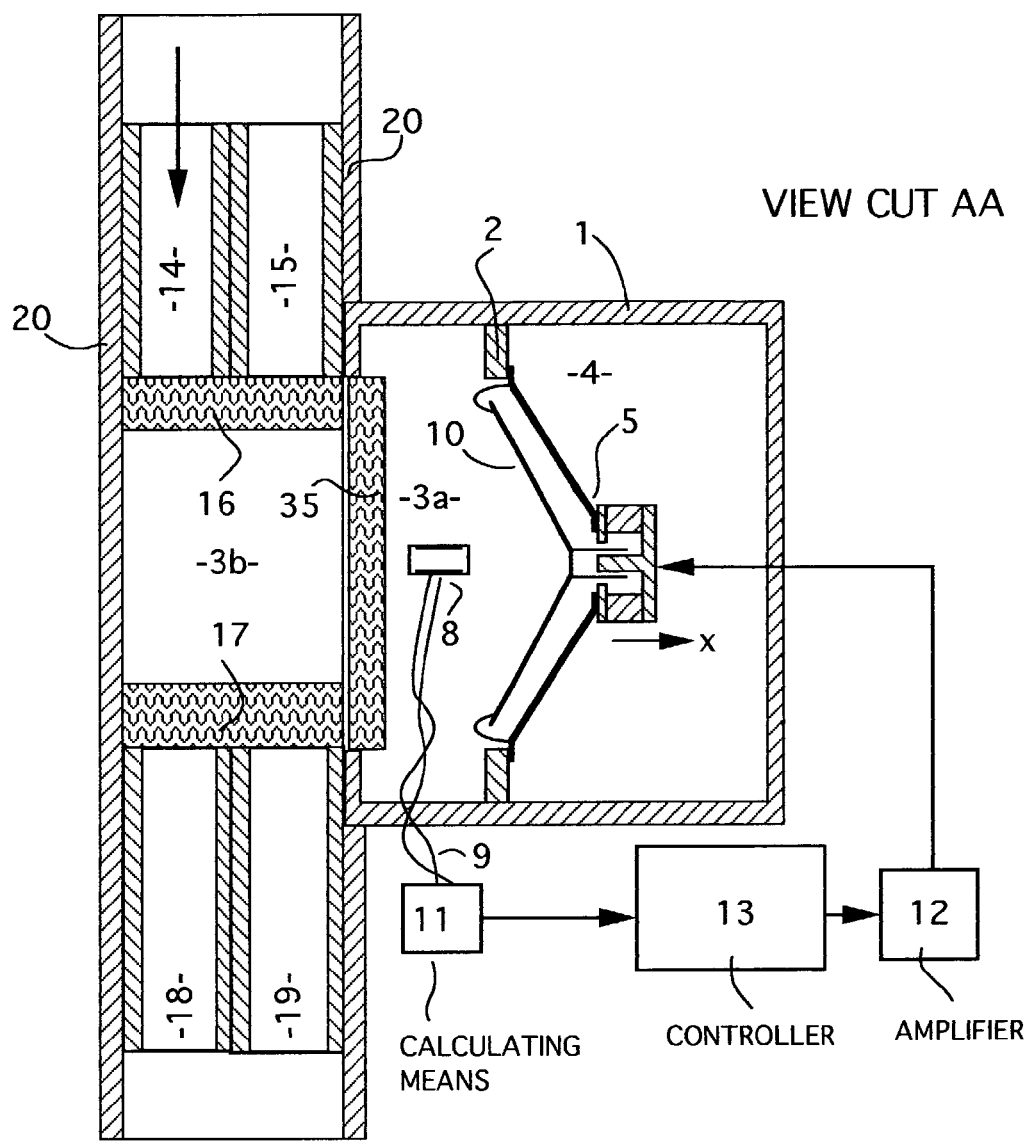
FIG. 1 is a schematic view of a noise blocking duct segment which is a preferred embodiment of the present invention.
Figure 1:
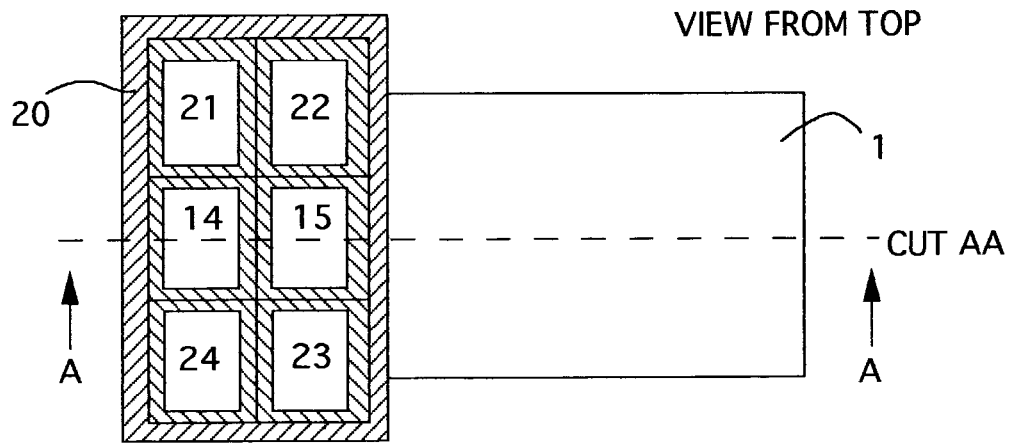

The following is a description of a first embodiment of the invention and refers to FIG. 1.

The system comprises an active acoustical impedance element which comprises a housing 1 with two main chambers, 3a, 4, seperated from each other by a substantially soundproof and almost pressure-tight wall 2. "Chamber" means in this context a pneumatically interconnected space within the housing. A chamber could be just a single compartment, or a chamber could consist of a multitude of compartments which are pneumatically connected to each other via openings which allow an easy air flow between each other with low flow resistance. The chambers could be coupled to each other by membranes too.

The first chamber of this "active acoustical impedance element", 3a, opens to the duct 20 via a hole in the wall of the housing 1. The duct itself consists of a multitude (one or more) of pipes (14, 15, 24, 25, 34, 35 are the inflow pipes; 18, 19, 28, 29, 38, 39 are outflow pipes). The inflow pipes end in (or open into) an intermediate chamber 3b, the "duct-chamber", and the outflow pipes start in this duct-chamber 3b. This chamber 3b is pneumatically connected with the chamber 3a via the opening of the housing 1. So air flows through the inflow-pipes into the duct-chamber and from there through the outflow-pipes to the outlet of the duct element.

The dimensions of the inflow pipes are critical for operation: The length and the diameter are chosen such that the pipes act as transmission line elements or such that the air within the pipes acts as mass-element. So the diameter of the duct pipes is chosen to be smaller then e.g. half of the wavelength of the highest frequency which should be effectively attenuated. The smaller the diameter the better the attenuation of higher frequency noise will be.

The pipes may optionally be terminated with some foamy or fibrous pieces of material (16, 17) which act as acoustical resistance to further improve the noise attenuation. They could also be used as dust filter. Another filter 35 could be arranged at the opening of the housing 1, i.e. between chamber 3a and duct-chamber 3b, again used as dust filter and/or to increase the stability of the control system of the active acoustical impedance element.

The following is a description of the active acoustical impedance element which works like the elements described in the patents U.S. Pat. No. 6,088,459 and U.S. Pat. No. 5,812,686.

The first chamber 3a is separated from the second chamber 4 by the inner wall 2. An electroacoustic transducer 5 is built into an opening of the inner wall 2 so that its membrane 10 separates the chamber 3a from the chamber 4.

Pressure sensing means 8 is placed in the first chamber 3a (in other embodiments they could also be placed in the duct-chamber 3b). It should be noted that chamber 3a can also be omitted so that the membrane 10 just adjoins to the duct-chamber 3b.

Pressure sensing means may be any element which generates an electrical signal indicative of the pressure p(t) (which may be absolute pressure or differences from a mean pressure $p_o$). The air pressure in this chamber 3a is measured by the pressure sensing means and a signal s(t) is produced indicative of this pressure or pressure differences. The signal s(t) produced by the pressure sensing means is forwarded via wires 9 to calculating means 11. Calculating means can be of the digital type (microcontroller) or of the analog type (e.g. operational amplifiers). By the calculating means 11 a calculation is performed using the pressure sensing means' output signal m(t) value as input value for the calculation. Based on that input value a momentary output value w(t) is calculated which is forwarded to the controller 13 as the setpoint value for the speed. This setpoint value w(t) determines how fast the membrane of the inner transducer should move, i.e. its speed. The controller drives via the power amplifier 12 the transducer's membrane 10. The controller is dimensioned to force the membrane to move with a membrane speed v(t) which is substantially equal to the momentary setpoint value for speed w(t) produced by the caclculator.

In the first embodiment the calculating means 11 calculate the output value w(t), i.e. the setpoint value for speed, as being proportional to the timely derivative dp(t)/d(t) of the measured air pressure p(t) in chamber 3a.

$$w(t)=K^*dp(t)/dt \qquad (1)$$

So the resulting speed v(t) of the inner transducer's membrane in outwards direction of chamber 3a (incrementing values on the x-axis, or incrementing volume of chamber 3a) equals the timely derivative of the air pressure in this chamber 3a multiplied by a chosen constant K. Constantly increasing pressure will cause a constant speed of the membrane outwards of chamber 3a:

$$v(t)=K^*dp(t)/dt \qquad (2)$$

As shown in U.S. Pat. No. 6,088,459 the inner transducer simulates an hypothetical inner chamber with a "simulated" volume V. The transducer behaves like an additional air chamber with a volume $V_i$. So the "effective" volume of 3a, and therefore also of the duct-chamber 3b, is increased by this configurable and simulated volume $V_i$. The cavity 3a can be called an "active cavity".

The acoustical series-connection of the passive pipe elements (the inflow-pipes) and this active cavity element (or more general the active acoustical impedance element) are the main characteristics of the invention. This arrangement ensures a high attenuation of noise at greatly reduced actual physical dimensions of the cavity.

An integration over time of equation (1) shows that the controller may control the membrane's excursion d(t) instead of the speed v(t) of the membrane according to the following formula to achieve equivalent results, i.e.

$$d(t)=\int v(t)^*dt=K(p(t)-p_0) \qquad (3)$$

So the excursion d(t) of the membrane, that is the deviation from the membrane's rest position without coil excitation, is proportional to the pressure deviation. This pressure deviation is the difference between the actual pressure p(t) and the timely mean pressure $p_0$.

An other solution would be that the controller controls the acceleration a(t) of the membrane according to $$a(t)=K^*d^2p(t)/dt^2 \qquad (4)$$

According to (11) the acceleration would be proportional to the second derivative of the pressure.

All three solutions are equivalent and known from the U.S. Pat. No. 6,088,459.

The controller 13 can either control directly the speed, or it can control the position of the membrane, or it can control the acceleration of the membrane. Accordingly it will get different kinds of setpoint values. This is valid too for the embodiments described in the following text. The calculating means produce such setpoint values of movement (position, speed or acceleration values) that the controller forces the inner transducer's membrane to move with the desired speed.

In another embodiment of the invention the setpoint values for movement are such that the membrane's speed is not proportional to the timely derivative of pressure but proportional to the timely integral of the pressure deviations from the mean pressure $p_0(t)$, i.e. the pressure changes:

$$v(t)=K^* \mathcal{S}(p(t)-p_0(t))^*dt \quad (5)$$

This is equivalent to $$dv(t)/dt=K^*(p(t)-p_0(t)) \quad (6)$$

According to (6) the acceleration of the membrane of the inner transducer depends on the pressure's deviation from the mean pressure. This is the behaviour of a mass with inertia. The inner transducer simulates an additional inner mass. So this is an "inductive" acoustical reactance if electrical analogies are used to describe the effects.

In another embodiment of the invention the setpoint values for movement are such that the speed of the membrane is proportional to a sum containing one or more of the following summands: Summands which are proportional to the timely derivative of the pressure, summands proportional to the timely integral of the pressure changes and summands proportional to the pressure differences itself:

$$v(t)=U^*(K^* \mathcal{S}(p(t)-p_0(t))^*dt+L^*dp(t)/dt++M^*(p(t)-p_0(t))) \quad (7).$$

So the membrane's speed is direct proportional with U to a sum which contains summands, said summands being proportional with K to the timely integral of said air pressure changes, or proportional with L to the timely derivative of said air pressure, or proportional with M to the air pressure difference itself. This creates even more possibilities to influence the frequency characteristic of the active bus duct.

In other embodiments the calculating means could calculate setpoint values for movement according to any suitable impedance function in accordance to the system of U.S. Pat. No. 5,812,686. This impedance function describes the dependency of the movement of the membrane 10 on the pressure measured by the pressure sensor 8. So the inner transducer will behave like an active acoustical impedance.

Figure 2:
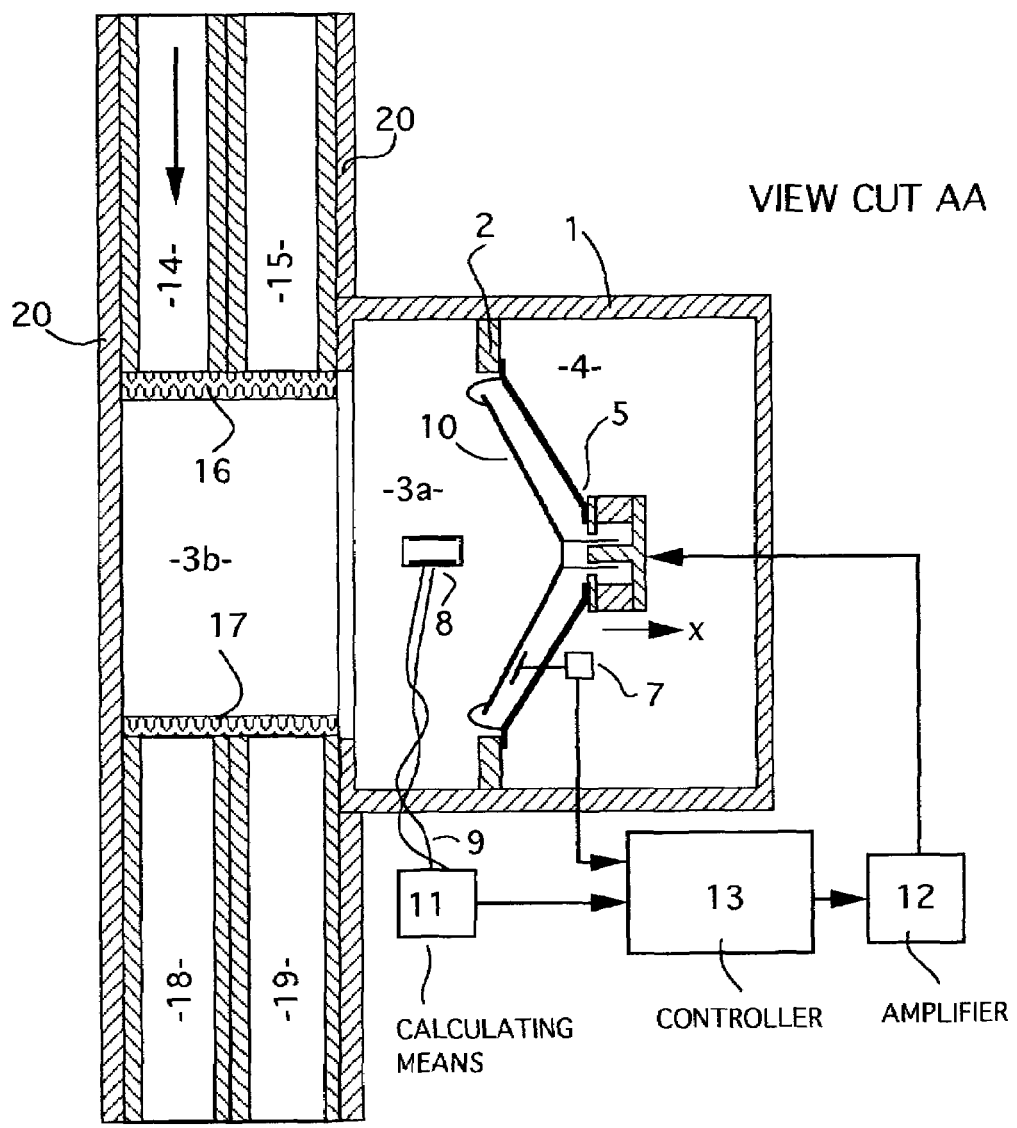
FIG. 2 is a schematic view of a similar noise blocking segment.
Figure 2:
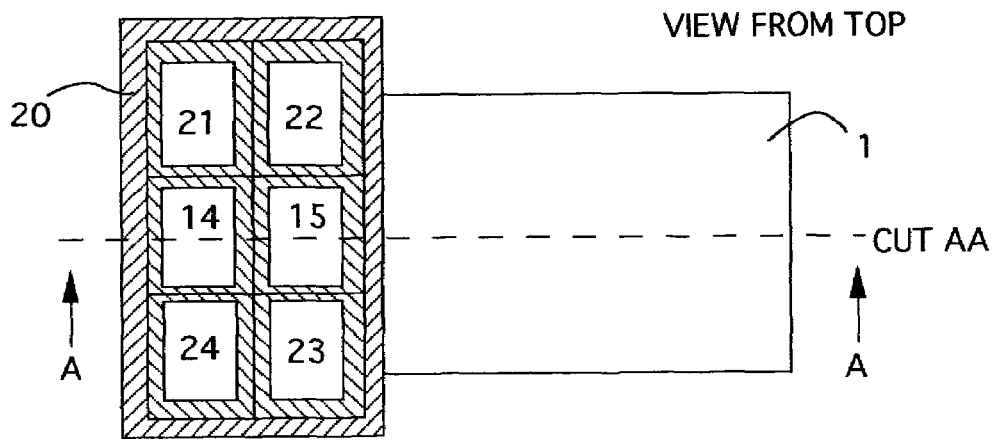

FIG. 2 shows a further embodiment which is very similar to the first embodiment. However it uses a closed loop speed control system which controls the movement of the inner membrane. It comprises in addition to the above described components of FIG. 1 measuring means 7 to measure the membrane's momentary values of movement, e.g. a speed sensor. The speed sensor measures the actual speed of the membrane 10. It should be understood that other sensors, e.g. acceleration sensors or position, can be used too to measure the movement of the membrane. If the acceleration is measured by the sensor the speed value can be gained by integration of the acceleration, if position is measured then speed is the timely derivative of the position. The output of the measuring means 7 is connected to the controller 13 which drives via the power amplifier 12 the transducer's membrane. The controller is dimensioned to hold the membrane's momentary speed equal to the calculated momentary speed setpoint. It uses the speed information for comparison of the actual state of movement with the setpoint value in the manner well known from control theory. It should be understood that instead of operating just with the speed also other values of the membrane's movement, e.g. acceleration and excursion, can be measured and used by the controller to control the movement of the membrane (state space controller). The controller can be a single-variable controller, or a multi-variable, multiloop topology may be used (e.g. state-space controller). Digital controllers (micro-processors) may be used as well as analog types (operational amplifiers). Generally spoken the controller tries to achieve equality between the calculated setpoint values of movement and the measured momentary values of movement.

In the following text the assembly of housing 1, inner separation wall 2, electromechanic transducer 5 with membrane 10, pressure sensing means 8 and, optionally, movement sensor 7 is called the "active acoustical impedance element". The individual components will not be shown in the following drawings.

Figure 3:
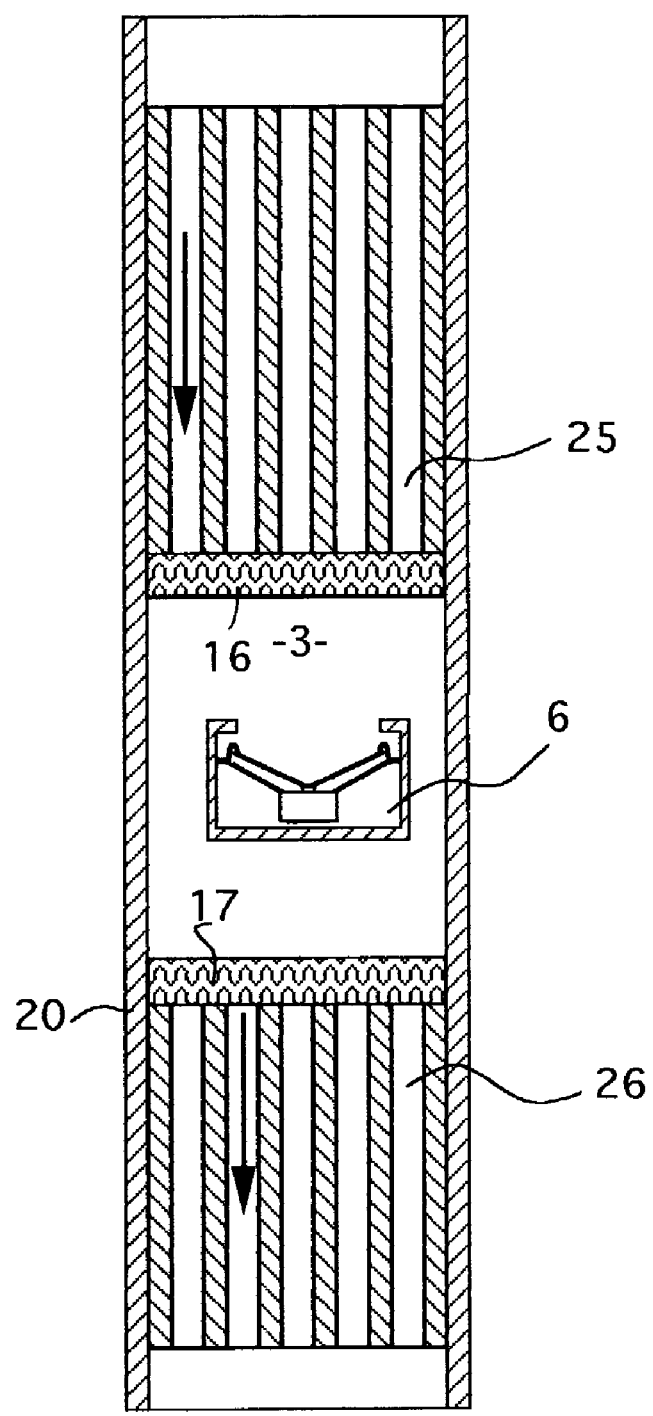
FIG. 3 is a schematic view of a third embodiment.

FIG. 3 shows an embodiment similar to the previous ones, however the active acoustical impedance element 6 is completely built into the duct-chamber 3.

Figure 4:
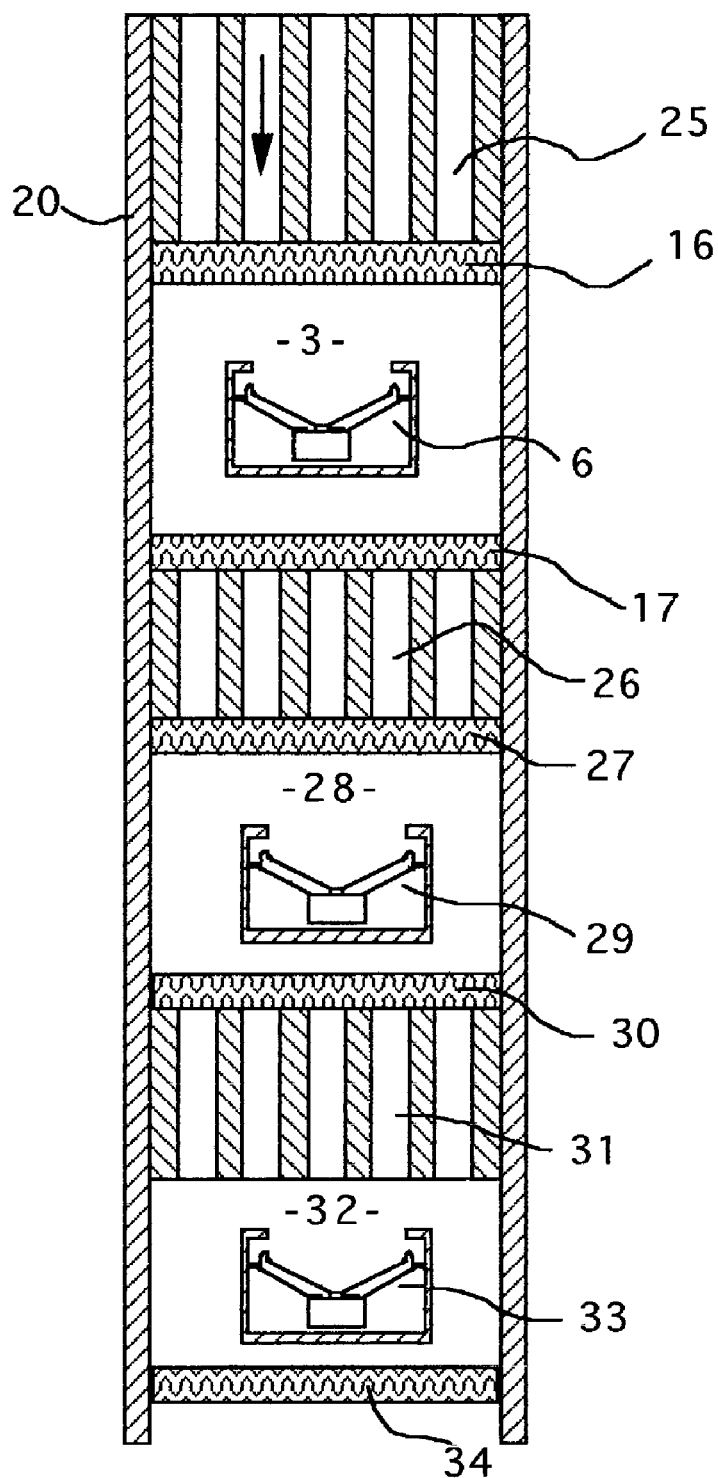
FIG. 4 is a schematic view of another embodiment which uses two active elements in series.

FIG. 4 shows an duct element 20 with three active acoustical impedance elements 6, 29, 33 arranged in series in air-flow direction. A first pipe or bundle of pipes 25 leads into a first duct-chamber 3. The air or gas flows from there through a second pipe or bundle of pipes 26 into a second chamber 28, from there through a outlet pipe or bundle of pipes 31 into chamber 32, from there to the outlet of the pipe. Filter elements 16, 17, 27, 30, 34 may be arranged optionally.

Figure 5:
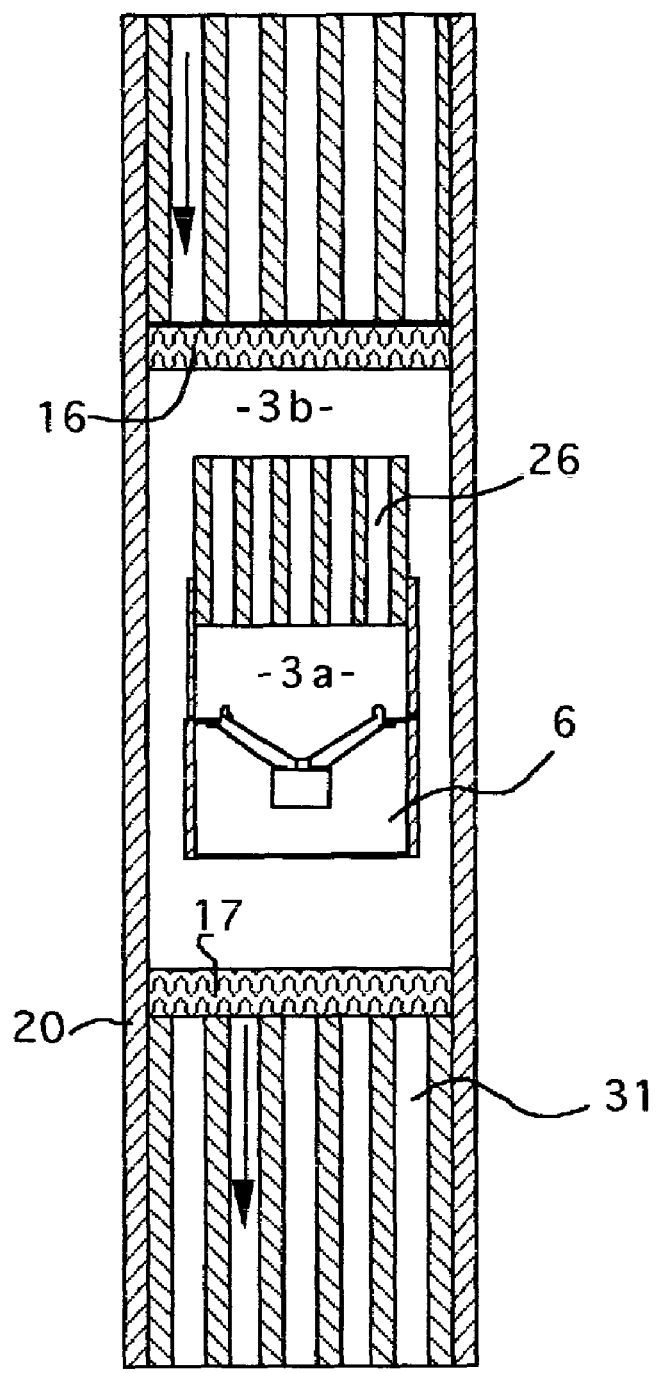
FIG. 5 is a schematic view of a fifth embodiment which uses special resonance elements.

FIG. 5 shows a duct element 20 similar to that of FIG. 3. However between chambers 3a and 3b, i.e.at the mouth of the active acoustical impedance element, a further bundle of air pipes 26 (one pipe or more) is arranged. The active acoustical impedance element 6 is tuned to act as a Helmholtz resonator together with these pipes 26.

To summarize, the "Active noise attenuating duct element" comprises the following main elements:

One or more inflow-pipes, through which the air flows at first. The inner diameter of these inflow-pipes is smaller (e.g. one half) than the acoustical wavelength of the highest frequency to be actively attenuated by the duct element.

One or more intermediate air chambers, called the duct-chambers, arranged at the outflow-ends of the inflow-pipes such that air flows from the inflow-pipes into these duct-chambers. The duct-chambers are also equipped with outflow-ports through which air leaves the chambers.

One or more active acoustical impedance elements as described above, which are pneumatically connected to the duct-chambers for influencing the air pressure in these chambers.

Optionally some outflow-pipes with small diameters like the inflow pies.

The dimensions of the inflow-pipes (i.e. lengths and diameters) and of these duct-chambers and the transfer characteristics of the active acoustical impedance elements are adapted to each other to achieve the behaviour of an acoustical low-pass or band-pass filter of higher order.

In such an active noise attenuating duct element the dimensions of the inflow-pipes are may be chosen such that the air within these inflow-pipes acts substantially as a mass-element in a frequency range which substantially exceeds the upper limit of the passband of the duct element. So the pipes are so short and thin that no wave effects take place in the frequency range to be attenuated.

In another version of the active noise attenuating duct element the dimensions of said inflow-pipes are chosen such that said inflow-pipes act as transmission lines. The length is chosen to be smaller then ¼ of the wavelength of waves with the highest frequencies to be actively attenuated. In this case a pressure-change amplitude minimum at the end of the inflow-pipes (due to "open end pipe") will correspond to a pressure-change maximum at the inlet of the inflow-pipes.

In addition the inflow-pipes may be equipped with noise absorbing material for attenuation of higher frequency noise which is difficult to attenuate actively.

Usually the active noise attenuating duct element will show all three of the above characteristics. At lower frequencies the air will behave as a mass element, at higher frequencies the pipes will behave as transmission lines, even higher frequencies will be absorbed by noise absorbing material.

So the dimensions of the air-pipes (inflow-pipes or also outflow-pipes) are selected to achieve the acoustical behaviour of an air-mass or transmission-line in the frequency range to be attenuated.

The active noise attenuating duct elements are equipped with active acoustical impedance elements which, for example, substantially increase the effective acoustical volume of the air chambers. So the air chamber seems to be (acoustically) substantially larger then its actual physical dimensions indicate. This mechanism is described in detail in the text above.

The active acoustical impedance element is pneumatically connected to said duct-chamber for influencing the air pressure in this chamber. This active acoustical element is known from the U.S. Pat. Nos. 5,812,686 and 6,088,459. This active acoustical element further comprises
  a housing,
  inner wall means (e.g. a wall made of wood or plastics or similar materials) for dividing the inner volume of said housing into at least two chambers,
  wherein the first of said chambers is pneumatically connected to said duct-chamber via an opening (mouth) in the housing, or via further air pipes as described below,
  at least one electromechanic transducer (e.g. an electrodynamic loudspeaker), being built into an opening of said inner wall means such that its membrane separates said first chamber from a second chamber,
  pressure sensing means (e.g. a piezo pressure sensor or electret sensor, or capacitive sensor, or any other electrical sensor) being placed in said first chamber or in said duct-chamber, for measuring the air pressure in said first chamber and for producing first electrical signals indicative of said air pressure,
  calculating means (e.g. an analog or digital calculator or processor), to the input of which said first signals produced by said pressure sensing means are applied, for calculating output signals based on the values of said first signals and based on a methematical impedance function, which describes the dependancy of the membrane's movement on the measured air pressure (this dependency is typically described by a linear differential equation of higher order; the impedance function would be the transfer function in the Laplace frequency domain),
  a control system, for controlling the movement of said membranes of said electrodynamic transducers, comprising
  one or more power amplifiers, the outputs of said amplifiers being connected to said electrodynamic transducers to drive said transducers,
  one or more electrical (digital or analog) controllers, to the inputs of which said output signals produced by said calculating means are applied, the outputs of said electrical controllers being connected to the inputs of said power amplifiers to drive these amplifiers,
  wherein said calculating means and electrical controllers are dimensioned to force said transducers' membranes to move with a speed (and therefore of course acceleration and other derivatives) which is determined by the impedance function.

Another active acoustical impedance element uses a control system of the closed-loop control type. It further comprises measuring means (e.g. position, speed, acceleration sensors) for measuring the movement of said transducer's membranes and for producing signals indicative of this movement. The electrical controllers receive at their inputs the signals produced by said calculating means and the signals produced by said movement measuring means,
  wherein said signals produced by said calculating means are applied as setpoint values for movement of said transducers membranes,
  and wherein said controllers control the movement of said membranes by processing the differences between said setpoint values for movement and said signals received from said movement measuring means.

A further active noise attenuating duct element comprises a multitude of duct elements as described above. The individual duct elements are connected in series in air flow direction. So air flows first through the first element, then through the second and so on. This arrangement acts as an acoustical series connection of low-pass filters.

Another active noise attenuating duct element is equipped with an active acoustical impedance element which comprises additional air pipes at its mouth. The mouth is the opening of the housing of the active acoustical impedance element through which a pneumatical connection to the duct-chamber of the duct is achieved. By putting in additional air pipes a resonant behaviour can be achieved (Helmholtz resonator).

While the present invention has been described in connection with particular embodiments thereof, it will be understood by those skilled in the art that many changes and modifications may be made without departing from the true spirit and scope of the present invention. Different types of housings, of transducers, of sensors, of control system topologies may be used. Therefore, it is intended by the appended claims to cover all such changes and modifications which come within the true spirit and scope of this invention.

What is claimed is:

1. Active noise attenuating duct element, comprising
  one or more inflow-pipes, the lengths and widths of which are selected to achieve the acoustical behaviour of an air-mass or transmission-line in the frequency range to be attenuated,
  one or more duct-chambers, arranged such that air flows from said inflow-pipes into said duct-chambers, said duct-chambers being equipped with an outflow-port through which air leaves the chamber,
  one or more active acoustical impedance elements pneumatically connected to said duct-chambers for influencing the air pressure in these chambers,
  wherein the lengths and widths of said inflow-pipes and the dimensions of said duct-chambers and the transfer characteristics of said active acoustical impedance elements are adapted to each other to achieve the behaviour of an acoustical low-pass or band-pass filter of higher order,
  and wherein said active acoustical impedance element further comprises
    a housing,
    inner wall means for dividing the inner volume of said housing into at least two chambers, wherein the first of said chambers is pneumatically connected to said duct-chamber, at least one electromechanic transducer, being built into an opening of said inner wall means such that its membrane separates said first chamber from a second chamber, pressure sensing means being placed in said first chamber or in said duct-chamber, for measuring the air pressure and for producing first signals indicative of said air pressure, calculating means, to the input of which said first signals produced by said pressure sensing means are applied, for calculating output signals based on the values of said first signals and based on a methematical impedance function, which describes the dependance of the membranes movement on the measured air pressure, a control system, for controlling the movement of said membranes of said electrodynamic transducers, comprising one or more power amplifiers, the outputs of said amplifiers being connected to said electrodynamic transducers to drive said transducers, one or more electrical controllers, to the inputs of which said output signals produced by said calculating means are applied, the outputs of said electrical controllers being connected to the inputs of said power amplifiers, wherein said calculating means and electrical controllers are dimensioned to force said transducers' membranes to move with a speed which is determined by said impedance function.

2. Active noise attenuating duct element according to claim 1, wherein the lengths and widths of said inflow-pipes are chosen such that the air within said inflow-pipes acts substantially as a mass-element in a frequency range which substantially exceeds the upper limit of the passband of the duct element.

3. Active noise attenuating duct element according to claim 1, wherein the lengths and widths of said inflow-pipes are chosen such that said inflow-pipes act as transmission lines.

4. Active noise attenuating duct element according to claim 1, wherein said inflow-pipes are equipped with noise absorbing material.

5. Active noise attenuating duct element according to claim 1, wherein said active acoustical impedance elements substantially increase the effective acoustical volume of said duct-chambers.

6. Device according to claim 1, further comprising measuring means for measuring the movement of said transducers' membranes and for producing signals indicative of this movement, wherein said electrical controllers receive at their inputs the signals produced by said calculating means and the signals produced by said movement measuring means, wherein said signals produced by said calculating means are applied as setpoint values for movement of said transducers' membranes, and wherein said controllers control the movement of said membranes by processing the differences between said setpoint values for movement and said signals received from said movement measuring means.

7. Active noise attenuating duct element according to claim 6 wherein said first chamber is omitted such that said membrane of said transducer adjoins directly to said duct chamber.

8. Active noise attenuating duct element according to claim 1, wherein further air pipes are arranged at the out-flow port of said duct-chamber such that air leaves the element through said further air pipes.

9. Active noise attenuating duct element, comprising a multitude of active noise attenuating duct elements according to claim 1, wherein said active noise attenuating duct elements are connected in series in air flow direction.

10. Active noise attenuating duct element according to claim 1, wherein said active acoustical element comprises additional air pipes at its mouth.

11. Active noise attenuating duct element according to claim 1, wherein said first chamber is omitted such that said membrane of said transducer adjoins directly to said duct chamber.

* * * * *